United States Patent [19]

Misawa

[11] Patent Number: 4,716,429

[45] Date of Patent: Dec. 29, 1987

[54] DISPLAY APPARATUS FOR SINGLE-LENS REFLEX CAMERA

[76] Inventor: Isao Misawa, 6-Go, Wakame-sou, 1-31-12 Higashi-nogawa, Komae-Shi, Tokyo, Japan

[21] Appl. No.: 945,370

[22] Filed: Dec. 22, 1986

[30] Foreign Application Priority Data

Dec. 23, 1985 [JP] Japan .............................. 60-196563[U]

[51] Int. Cl.$^4$ .......................... G03B 3/10; G03B 17/20
[52] U.S. Cl. .................................. 354/409; 354/289.1
[58] Field of Search ...................... 354/289.1, 409, 474, 354/475

[56] References Cited

U.S. PATENT DOCUMENTS 4,400,071  8/1983  Tamura et al. ...................... 354/409
4,655,572  4/1987  Kato ............................. 354/289.1 X

*Primary Examiner*—Michael L. Gellner
*Attorney, Agent, or Firm*—Stiefel, Gross, Kurland & Pavane

[57] ABSTRACT

A microprocessor (CPU) controlled autofocus single-lens reflex camera having an interchangeable lens displays the subject distance (3) and the corresponding subject vertical and horizontal dimensions (1,2) in the camera viewfinder adjacent to the in-focus picture (4) which normally appears in the viewfinder by calculating data obtained by a subject distance detecting means and by a focal distance detecting means for detecting the lens focal distance which is used to determine the field angle. The relationship in size between the normal camera picture size and the subject (4) are calculated to provide the corresponding subject dimensions which are displayed in the viewfinder (1,2,3).

10 Claims, 5 Drawing Figures

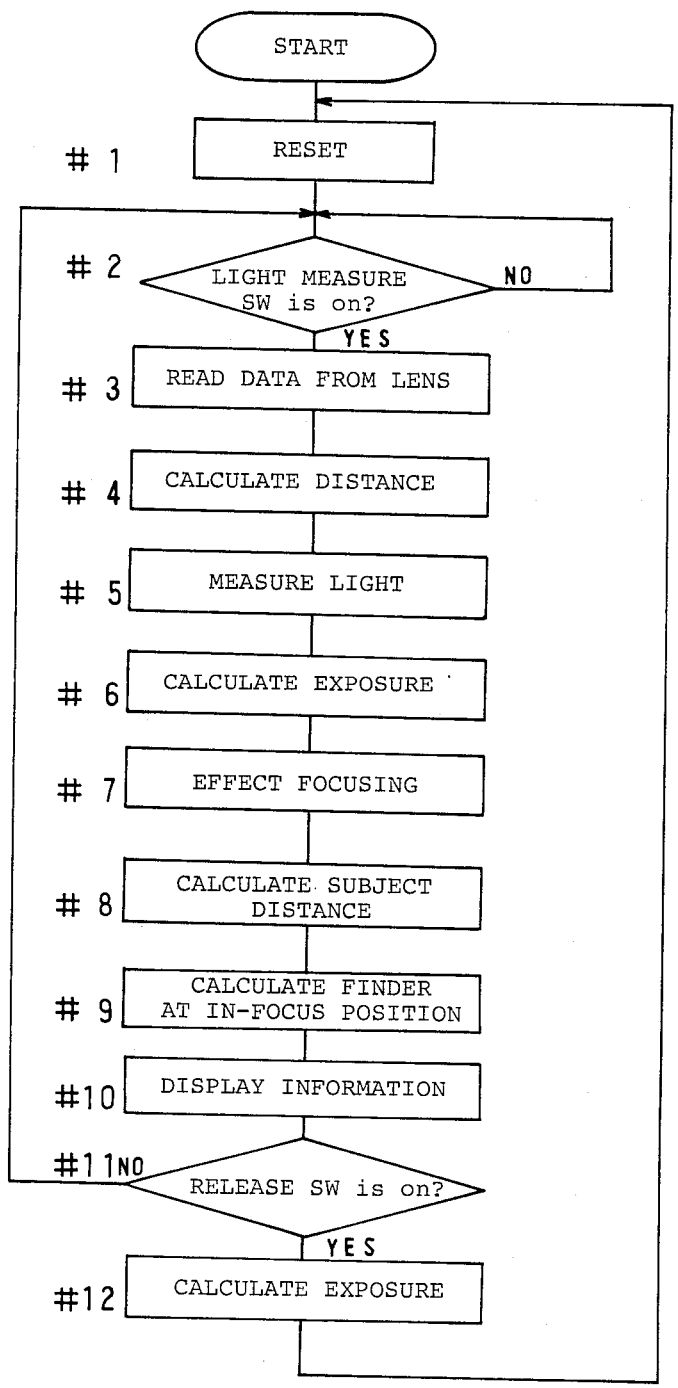

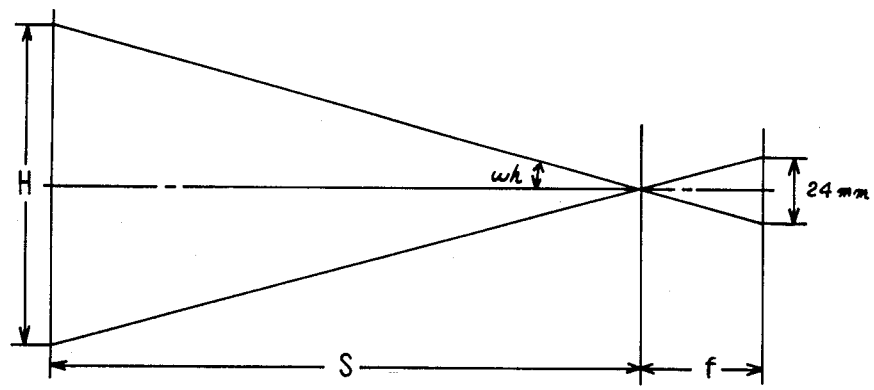
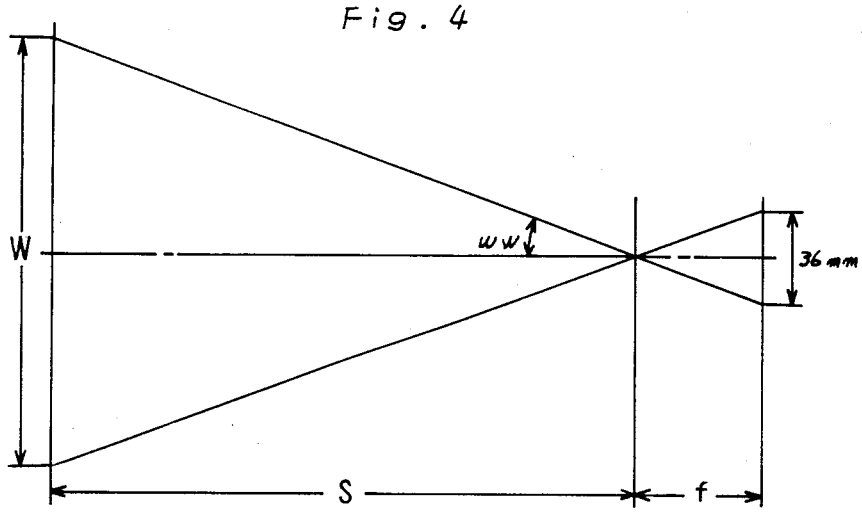
Fig. 4
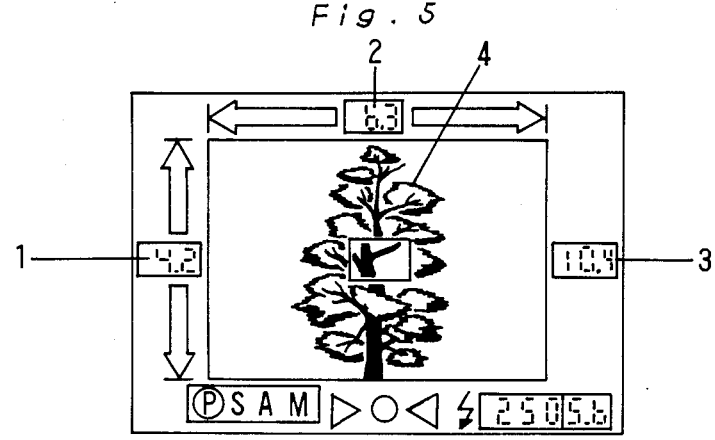
Fig. 5

DISPLAY APPARATUS FOR SINGLE-LENS REFLEX CAMERA

BACKGROUND OF THE INVENTION

1. Field of the Invention

The present invention relates to a display apparatus for a single lens reflex camera of the type having an interchangeable lens, and more particularly to such a display apparatus for displaying dimensions of a subject.

2. Description of the Prior Art

Conventionally, various parameters, such as shutter speed, an F-stop value, etc., which are necessary for taking a photograph are displayed in the viewfinder in a prior art single-lens reflex camera, such as one of the prior art manual types. With the proliferation of autofocus and autoexposure single-lens reflex cameras commercially available today, the contents of the display in the viewfinder of such a single-lens reflex camera has increased to display such other factors as stroboscope charging-up operation completion, in-focus condition confirmation, etc.

For many years, there has existed a need to know the distance to a subject or the size of a subject. In one such prior art method of measuring a subject distance using a single-lens reflex camera, the subject distance is obtained by the use of a distance scale mark on the interchangeable lens after the focus adjustment has been completed. The size of the subject can also be obtained by reading scale marks indicative of a height and a width on a finder picture, with these seale marks being formed near the distance scale marks on the interchangeable lens. In such a prior art conventional method, however, since the focus is adjusted manually, there exists various drawbacks in that there is a difference between individuals and additionally there is an error according to the focal distance of the lens. Further, in the case where such means is applied to a zoom lens, it is impossible to display the size of a subject because the size corresponding to the finder picture changes according to the focal distance. These disadvantages of the prior art are overcome by the present invention.

SUMMARY OF THE INVENTION

In a single-lens reflex camera having an interchangeable lens and being provided with an automatic focus detecting function, the present invention displays a subject distance and subject dimensions in the camera viewfinder by calculating data obtained by subject distance detecting means for detecting a distance to a subject and by focal distance detecting means for detecting a focal distance of the interchangeable lens. The distance to the subject is measured in the camera body; a field angle is obtained on the basis of the focal distance of the interchangeable lens; the relationship in size between the 35 mm picture and the subject are calculated; and the corresponding dimensions of the subject are obtained and displayed in the vertical and horizontal directions in the picture in the camera viewfinder.

BRIEF DESCRIPTION OF DRAWINGS

FIG. 2 is a logic flow diagram illustrative of the operation of the microprocessor of FIG. 1 in accordance with the present invention;

FIGS. 3 and 4 are diagrammatic illustrations for purposes of explaining the relationship between subject distance and field angle in accordance with the present invention; and FIG. 5 is a diagrammatic illustration of a typical viewfinder display in accordance with the present invention.

DETAILED DESCRIPTION OF THE INVENTION

Figure 1:
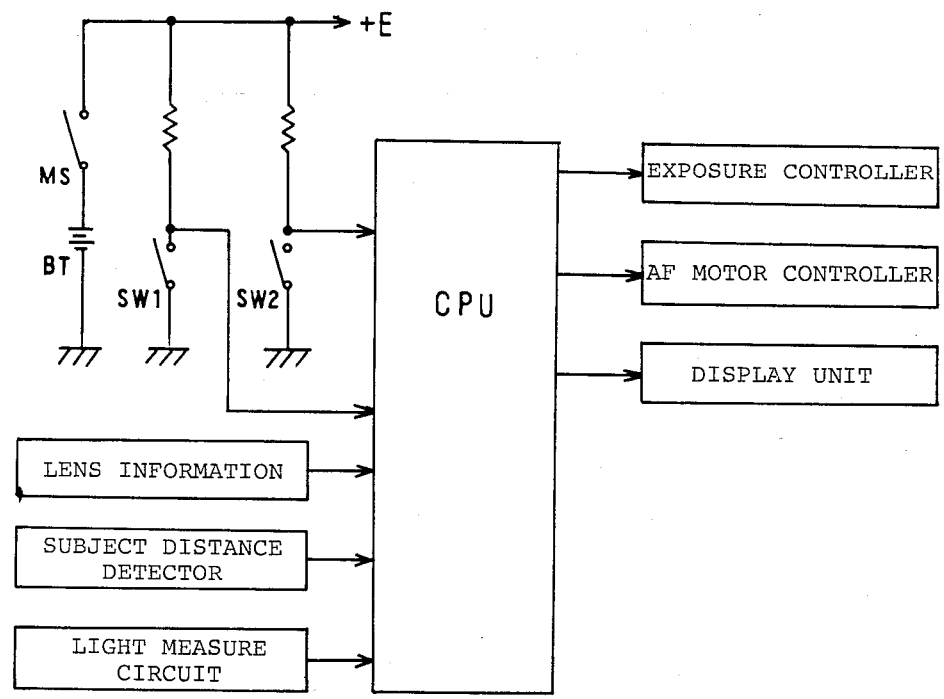
FIG. 1 is a block diagram showing a typical camera system employing the present invention.

Referring now to the drawings in detail, FIG. 1 is a block diagram showing a typical camer system employing the present invention; FIG. 2 is a flowchart showing the operation of the microcomputer (CPU) of FIG. 1; FIGS. 3 and 4 are diagrammatic illustrations useful in understanding the relationship between subject distance and field angle; and FIG. 5 is an illustration of a typical viewfinder display in accordance with the present invention.

Referring now to FIG. 1, BT denotes a conventional camera battery cell, and MS denotes a manual power switch. When this power switch MS is closed, a voltage is supplied from a power line +E to the microprocessor (CPU). The label SW1 denotes a conventional light measure switch which is closed when a release button (not shown) is depressed to the first step. When this switch SW1 is closed, data such as focal distance information, open F-stop value, a minimum F-stop value, etc. are inputted as information peculiar to the particular interchangeable lens mounted on the camera. A light signal detected by a conventional CCD image element is conventionally transduced into an electric signal. On the basis of this transduced electric signal, a distance measuring calculation is effected as will be described in greater detail hereinafter. The distance information detecting circuit obtains distance information for the subject in such a way that a pulse is generated from an encoder (associated with an autofocus or AF motor disposed in the camera to conventionally drive the interchangeable lens drive mechanism) in response to a focal distance information inputted from the interchangeable lens mounted on the camera; and the number of pulses are counted beginning from a predetermined initial position (the least distance or infinity) of the lens drive mechanism to an in-focus position, in order to obtain a subject distance information on the basis of a coefficient representative of a change in in-focus distance relative to a mechanism drive stroke inputted from the interchangeable lens. The calculated value is outputted to a circuit for conventionally controlling a motor for driving the focusing lens system of the interchangeable lens. On the other hand, the subject distance and the field angle which are calculated based upon the focal distance information of the interchangeable lens are calculated to obtain subject dimensions corresponding to the viewfinder picture and to display these dimensions therein.

Referring now to FIG. 2, a flowchart for showing the operation of the microprocessor or CPU in accordance with the present invention is shown. The operation of the camera system shown in FIG. 1 will now be described with reference to the flowchart of FIG. 2. When the power switch MS is closed, a power voltage is supplied to the CPU. After reset, the CPU stands by until the light measure switch SWI is closed at step number 2. When this switch SW1 is closed, various information such as focal distance information and open F-stop value information peculiar to the particular interchangeable lens mounted on the camera, and a coefficient indicative of a ratio of a change in in-focus distance to a drive stroke of the interchangeable lens mechanism are read and inputted to the CPU at step number 3, with the process then proceeding to step number 4. In this step, the distance measuring calculation is made; that is, a light distance signal is conventionally transduced into an electric signal by the conventional CCD image element, and a distance is measured on the basis of the transduced signal. The calculated value is outputted to the autofocus or AF motor control circuit to stand-by the focus adjustment operation. In step number 5, a light is conventionally measured by the light measure circuit, and luminance information detected by the light measure circuit is inputted to the CPU. In step number 6, an exposure is conventionally calculated on the basis of the inputted luminance information to calculate an F-stop value and a shutter speed. On the basis of the rotational direction and the rotational mount of the autofocus or AF motor obtained by the distance measuring calculation, the AF motor is conventionally driven in step number 7, and the subject distance is calculated on the basis of the signal detected by the subject distance information detecting circuit in step number 8.

Subsequently, the height and width dimensions corresponding to the viewfinder picture at in-focus position are calculated at step number 9 as follows, assuming a 35 mm film:

since the film size of a 35 mm picture is 36×24 mm, the relationship between subject dimensions in a viewfinder picture and field angles can be expressed with reference to FIGS. 3 and 4 as follows:

$$\tan wh = 24/(2\times f)$$

$$\tan wW = 36/(2\times f)$$

where
wh denotes the half vertical field angle,
wW denotes the half horizontal field angle,
f denotes the focal distance.
On the basis of the above relationship, the height and width of a subject can be expressed as $$H = 2\times \tan wh \times S$$

$$W = 2\times \tan wW \times S$$

where
H denotes the subject height,
W denotes the subject width,
S denotes the subject distance.

When the above calculation has been completed, the subject dimensions calculated so as to correspond to the height and width on the viewfinder picture, the subject distance, the F-stop value, and the shutter speed are displayed in the viewfinder.

When the release switch SW2 is closed in step number 11, the CPU returns to step number 2 to repeat the execution from step number 2 to step number 11. Further, when the release switch SW2 is closed, the exposure control is executed in step number 12, and all the processing is completed, so that the CPU returns to step number 1 to stand-by for the next succeeding shot. It should be noted that the CPU is a conventional microprocessor of the type normally employed for autofocus and/or autoexposure control in conventional commercially available single lens reflex cameras, such as available from Nikon, Minolta or Olympus, and which has been conventionally programmed to perform the above operations.

Referring now to FIG. 5, a typical display in a viewfinder in accordance with the present invention is shown. Reference numeral 3 denotes a subject distance, reference numeral 1 denotes subject length corresponding to the vertical dimension or vertical subject distance of the viewfinder picture, and reference numeral 2 denotes a subject length corresponding to the horizontal dimension or horizontal subject distance of the viewfinder picture. Therefore, assuming that the illustrated tree is the subject 4, it is possible to know that the distance to the tree is 10.4 m and the height of the tree is 4.2 m, as shown in FIG. 5.

By use of the display apparatus according to the present invention, it is thus possible to readily know the dimensions of a subject. Therefore, the camera is available as a distance meter. When a zoom lens is used, in particular, it is possible to freely measure any subjects by changing the focal distance to change the field on the view finder picture.

What is claimed is:

1. In a single lens reflex camera of the type having a camera body removably mountable to an interchangeable lens and comprising means for effecting autofocusing of said mounted lens, said camera body comprising a viewfinder picture display means for displaying an in-focus picture of a subject to be photographed; the improvement comprising means for detecting and displaying the distance to said subject from said camera in said viewfinder picture display means adjacent said in-focus picture, and means for detecting a focal distance of said interchangeable lens removably mounted to said camera body and for displaying corresponding vertical and horizontal dimensions of said subject based on said detected lens focal distance, said subject vertical and horizontal dimension display further being provided in said viewfinder picture display means adjacent said in-focus picture, said subject vertical and horizontal dimension display providing means comprising means for obtaining a field angle based on said detected lens focal distance and for calculating a relationship in size between the camera picture size and said subject; whereby the vertical and horizontal dimensions of an in-focus subject and the distance to said subject may be displayed in the camera viewfinder along with the in-focus picture of the subject in an improved single lens reflex camera display apparatus.

2. An improved single lens reflex camera display apparatus in accordance with claim 1 wherein said camera picture size comprises a 35 mm picture.

3. An improved single lens reflex camera display apparatus in accordance with claim 1 wherein said camera body comprises a microprocessor means for controlling the operation of said viewfinder display means for providing said in-focus subject distance and subject corresponding vertical and horizontal dimension displays adjacent said in-focus picture, said microprocessor means determining said field angle based on said detected lens focal distance and calculating said size relationship for providing a viewfinder display control signal comprising display data corresponding to said subject vertical and horizontal dimension displays.

4. An improved single lens reflex camera display apparatus in accordance with claim 3 wherein said removably mounted interchangeable lens comprises means for providing said lens focal distance information to said microprocessor means in said camera body.

5. An improved single lens reflex camera display apparatus in accordance with claim 4 wherein said camera further comprises a lens focus drive mechanism for moving said removably mounted lens to a in-focus position for providing said in-focus picture, said subject distance detecting means further comprising means for detecting said subject distance based on a detected change in in-focus distance relative to the focus drive stroke for said removably mounted lens focus drive mechanism.

6. An improved single lens reflex camera display apparatus in accordance with claim 5 wherein said means for providing said viewfinder display control signal comprises means for providing said display control signals in accordance with the following relationship:

$$H = 2 \times \tan wh \times S$$

$$W = 2 \times \tan wW \times S$$

where H corresponds to said subject vertical dimension or height, W corresponds to said subject horizontal dimension or width, S denotes said subject distance, wh corresponds to the half vertical field angle, and wW corresponds to the half horizontal field angle.

7. An improved single lens reflex camera display apparatus in accordance with claim 6 wherein said film size is substantially 36×24 mm, said camera picture size comprising a 35 mm picture and $$\tan wh = 24/(2 \times f)$$

$$\tan wW = 36/(2 \times f)$$

where f corresponds to said lens focal distance.

8. An improved single lens reflex camera display apparatus in accordance with claim 3 wherein said means for providing said viewfinder display control signal comprises means for providing said display control signals in accordance with the following relationship:

$$H = 2 \times \tan wh \times S$$

$$W = 2 \times \tan wW \times S$$

where H corresponds to said subject vertical dimension or height, W corresponds to said subject horizontal dimension or width, S denotes said subject distance, wh corresponds to the half vertical field angle, and wW corresponds to the half horizontal field angle.

9. An improved single lens reflex camera display apparatus in accordance with claim 8 wherein said film size is substantially 36×24 mm, said camera picture size comprising a 35 mm picture and $$\tan wh = 24/(2 \times f)$$

$$\tan wW = 36/(2 \times f)$$

where f corresponds to said lens focal distance.

10. An improved single lens reflex camera display apparatus in accordance with claim 1 wherein said camera further comprises a lens focus drive mechanism for moving said removably mounted lens to an in-focus position for providing said in-focus picture, said subject distance detecting means further comprising mean for detecting said subject distance based on a detected change in in-focus distance relative to the focus drive stroke for said removably mounted lens focus drive mechanism.

* * * * *